April 28, 1970  C. K. N. PATEL  3,509,486
GAS LASER EMPLOYING CARBON DISULFIDE AND NITROGEN
Filed Oct. 28, 1965
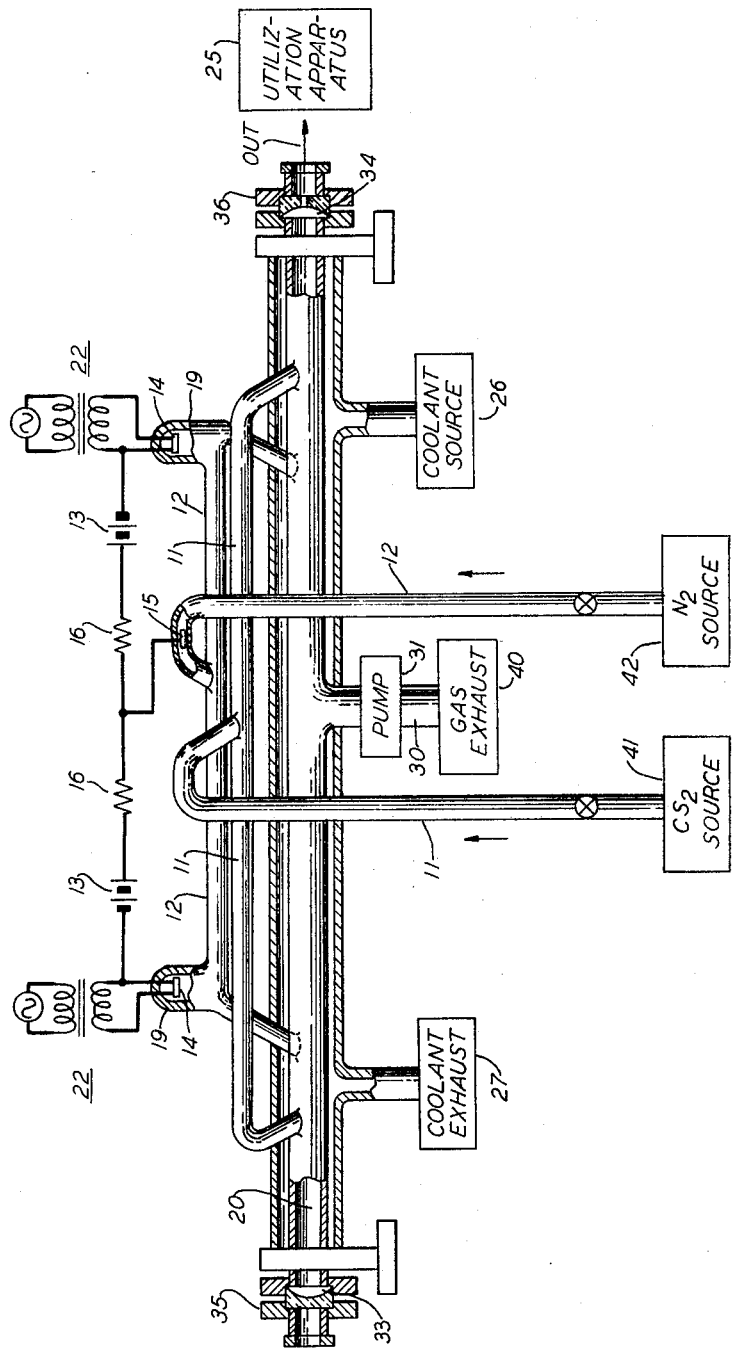
INVENTOR
C.K.N. PATEL
BY Wilford L. Wisner
ATTORNEY

3,509,486
GAS LASER EMPLOYING CARBON DISULFIDE AND NITROGEN
Chandra K. N. Patel, Chatham, N.J., assignor to Bell Telephone Laboratories, Incorporated, New York, N.Y., a corporation of New York
Filed Oct. 28, 1965, Ser. No. 505,566
Int. Cl. H01s 3/22
U.S. Cl. 331—94.5                                      7 Claims

ABSTRACT OF THE DISCLOSURE

This application describes arrangements for obtaining continuous-wave laser oscilaltions at 10 wavelengths between 11.48µ and 11.55µ. In accordance with one embodiment of the invention, a gas mixture of nitrogen and carbon disulfide is made to continuously flow through the interaction region of an apparatus adapted for the stimulated emission of radiation. The mixture is then suitably pumped to produce a substantial unreversed dissociation of the gases. The pumping further produces a population inversion between a pair of rotational energy states of different vibrational energy levels in a component of the gas mixture. The radiation corresponding to the energy levels is then extracted for utilization.

---

This invention relates to gas lasers.

It has heretofore been demonstrated that gas lasers can provide the stimulated emission of radiation with line widths that are generally narrower than those of solid state lasers; it has further been demonstrated that a molecular active gas such as carbon dioxide ($CO_2$) or nitrous oxide ($N_2O$) can provide unusually efficient lasing action, under the appropriate conditions. For example, a particularly efficient laser employing carbon dioxide and nitrogen is disclosed in my copending patent application, Ser. No. 474,546, filed July 26, 1965, and assigned to the assignee hereof.

My present invention in its preferred embodiment resides in the discovery of continuous-wave laser oscillation at 10 wavelengths between 11.48µ and 11.55µ from an active medium which is a mixture of nitrogen and carbon disulfide in an apparatus employing continuous flow of the gas mixture through the interaction region.

The invention may be more completely understood from the following detailed description, together with the drawing, in which the sole figure shows schematically and block diagrammatically a partially cutway view of a preferred embodiment of the invention.

As illustrated in the drawing, a laser operated according to the present invention included an interaction region comprising a chamber in which the lasing action was obtained, apparatus for furnishing therein an appropriate gas mixture, and apparatus for pumping the gas mixture to enable the stimulated emission of radiation therefrom.

Illustratively, the gas mixture was furnished by a continuous flow thereof from suitable sources 41 and 42 of carbon disulfide ($CS_2$) and nitrogen ($N_2$), respectively. The gases were flowed through inlet apparatus 11 and 12, respectively, into inner tube 20 which enclosed the interaction region, and the spent gases were removed from the interaction region to the exhaust 40 by a pump 31. If desired, the gases can be separated by appropriate means for reuse.

The gas mixture was excited by electrical discharge apparatus disposed in the inlet apparatus 12 in order to provide a discharge in the nitrogen only. Specifically, the discharge apparatus included the oxide-coated cathodes 14 disposed in bulbous appendages 19 of apparatus 12 near opposite ends of tube 20, the anode 15 disposed in inlet apparatus 12 relatively closer to nitrogen source 42, the D.C. voltage sources 13 with positive terminals connected to anode 15 through current-limiting resistors 16 and negative terminals connected to cathode 14, and the heater current sources 22 connected across cathodes 14.

Tube 20 was surrounded by a jacket 21 through which was flowed a coolant from source 26 to exhaust 27. Tap water at about 15° C. was used in the embodiment described in detail herein; but coolants capable of depressing the rotational temperature of the component gases even further below room temperature should be still more advantageous.

To achieve oscillation, it is important to include the interaction region in an optical resonator. In the specific design being discussed, the resonator was formed by a pair of mirrors 33 and 34 having 5 meters radii of curvature, and vacuum-evaporated reflecting gold coatings. The mirrors were spaced at 230 centimeters. Energy was coupled out through a one-millimeter uncoated aperture at the center of output mirror 34, which was made out of germanium. The mirrors were supported by suitable mirror mounts 35 and 36.

For use as a straight-through amplifier, the resonator becomes unnecessary; and the mirrors can be eliminated. In some instances, it may be preferred to locate the mirrors outside the tube 20, in which case Brewster-angle windows (for example of crystalline zinc sulfide, barium fluoride or potassium chloride) can be used to confine the interaction region. If the laser be used in the ring laser form, three or more mirrors are used to form the ring resonator.

The tube 20 in which the multiple gases interacted in the embodiment of the drawing was a glass tube, although it could be some other rigid tubular structure, such as a tube of plastic, quartz or even stainless steel, so long as provision is made for the exit of the laser beam. The glass tube 20 extended the distance between mirrors 33 and 34 and had an inside diameter of 25 millimeters. The effective interaction region was observed to extend approximately between the points at which the separate inlets of apparatus 12 enter tube 20 and was about 2 meters long.

Cathodes 14 were oxide-coated cathodes having platinum bases and containing barium carbonate and strontium carbonate in the respective proportions 45 percent and 55 percent by weight.

It should be understood that the stimulated radiation output has a variety of uses. The utilization apparatus 25 is illustratively an electro-optic modulator responsive to an information signal. The invention is useful for communication, inasmuch as the atmosphere has relatively low attenuation in the wavelength range from 11.48 to 11.55 microns. The wavelength range from 8–14 microns is commonly called an "atmospheric window" because of the relatively low atenuation of the atmosphere throughout that range.

In operation, optimum, or at least near optimum, nitrogen and carbon disulfide pressures for the conditions imposed by the described apparatus were found to be 2.0 torr and 0.1 torr, respectively. (760 torr=1 atmosphere). The corresponding nitrogen flow rate was 80 standard cubic centimeters per second; and the corresponding carbon disulfide flow rate was found to be 0.9 standard cubic centimeters per second. The D.C. voltage sources 13 each provided 50 milliamperes at 2000 volts, yielding a total pumping power of 200 watts. For this set of conditions the observed vacuum wavelengths and frequencies of the laser transitions are given in the following Table I:

| Wavelength in microns | Frequency in cm.$^{-1}$ | Relative intensity |
|---|---|---|
| 11.4823 | 870.90 | 0.18 |
| 11.4893 | 870.38 | 1.0 |
| 11.5962 | 869.85 | 0.27 |
| 11.5031 | 869.33 | 0.35 |
| 11.5099 | 868.82 | 0.18 |
| 11.5166 | 868.31 | 0.25 |
| 11.5237 | 867.80 | 0.12 |
| 11.5307 | 867.27 | 0.16 |
| 11.5376 | 866.73 | <0.1 |
| 11.5446 | 866.20 | 0.50 |

The estimated accuracy of the wavelength measurements was about ±2.5 A. corresponding to an accuracy of ±0.02 cm.$^{-1}$ in the determination of the frequencies. The transition at 11.4893 microns was the strongest and was assigned a relative intensity of 1.0. It produced a measured power output of about 10 milliwatts.

In the apparatus described, lasing action continued as the nitrogen pressure was varied from 0.5 Torr to 10.0 Torr and the carbon disulfide pressure from 0.05 Torr to 0.5 Torr. The corresponding nitrogen flow rates were 20 standard cc. per second to 400 standard cc. per second; and the corresponding carbon disulfide flow rates were 0.5 standard cc. per second, 5.0 standard cc. per second. The pumping power remained substantially the same, which was sufficient to produce accumulating deposition of carbon and sulfur in the tube 20.

It was found that the laser oscillation on each of the transitions in Table I occurred in a single longitudinal mode of the optical cavity; however, several different transitions oscillated at the same time. Length tuning on the optical cavity was used to select a combination of the aforesaid single modes to optimize the power output. This result implies that the Doppler width of the lines seen in laser oscillation is either comparable with or smaller than the frequency spacing $c/2L$ for the longitudinal modes of the optical cavity. ($c$ is the speed of light, $L$ is the resonator length in compatible units, and $c/2L$ for the present case=62 megacycles per second.) The close line spacing and narrow line widths indicate lasing action in a polyatomic gas fraction, the laser transistion occurring between rotational levels of different vibrational levels of that gas fraction, or at least involving its rotational and vibrational energy levels in some fashion. The polyatomic gas fraction is effective to produce lasing action in the presence of high-energy dissociation of the molecular gases. Nevertheless, I do not consider this condition necessarily to limit my invention.

There are several highly excited products from the nitrogen discharge that enter the interaction region. These products include vibrationally excited nitrogen, atomic nitrogen, molecular nitrogen excited to metastable electronic states and molecular nitrogen ions. The latter three varieties of product have enough energy to dissociate $CS_2$ and form polyatomic dissociation products, such as the free radical NS.

The formation of a polyatomic dissociation product such as NS has occurred to a substantial degree in the described apparatus. I base this statement upon the following observations. When lasing action started in the $N_2$-$CS_2$ mixture in the interaction region, with no discharge therein, there was, first, a faintly visible green glow in the interaction region and, second, clearly noticeable deposition of sulfur and carbon on the walls of tube 20 within the interaction region. The deposits accumulated continuously. These observations imply unreversed dissociation of $CS_2$ by some highly excited species. Although the dissociation may also produce free radicals such as CN and CS, as well as NS, NS is mostly likely to be the source of the observed laser transitions. Although NS, CN and CS are polyatomic and have vibrational energy levels and rotational energy levels that are appropriate for closely spaced laser transitions, NS is formed in larger quantities than CN and CS and thus is the most likely source of the observed laser transitions. The energy levels of all three dissociation products have not been completely determined because these products are so short-lived.

It appears less likely that the observed laser transitions occur between energy levels of carbon disulfide.

$CS_2$, a linear symmetrical molecule, has a vibrational level 10°1 at 2185.52 cm.$^{-1}$ in good coincidence with the $N^*_2(v=1)$ vibrational level of 2349.16 cm.$^{-1}$. Thus, transfer of vibrational energy to $CS_2$ is possible. The corresponding laser transition would be 10°1–20°0 with its band center at 872.05 cm.$^{-1}$, a frequency appreciably higher than those observed. Further, inasmuch as the 00°1 level of $CS_2$ is about 900 cm.$^{-1}$ from the $N^*_2(v=1)$ vibrational level of nitrogen, the 00°1–10°0 possible transition with its band center at 874.52 cm.$^{-1}$ should also be considered. Nevertheless, this frequency is also higher than those observed. Moreover, both of these transitions in carbon disulfide are so-called P-branch transitions with relatively low so-called J numbers. According to theory described in my article in Physical Review Letters 12, p. 588 (1964), practical laser transitions with reasonable population inversion in $CS_2$ should have J numbers in the range of 50–80 at a molecular temperature of 300° K, since $CS_2$ has a constant $B_e$=0.10933 cm.$^{-1}$. A J number of 50–80 is much higher than can be associated with the present observations.

In any event, the resonator comprising reflectors 33 and 34 is adapted to resonate a group of closely spaced lines characteristic of vibrational-rotational transitions.

It is characteristic of the apparatus described herein that lasting action is obtained from a component of a mixture of molecular gases in which high-energy dissociation is in progress. The dissociation is substantial and unreversed.

Various modifications of my invention may be made. The nitrogen may be separately excited by heating it; or the gases may be pumped by a discharge therein after they have entered the interaction region. With a sufficiently efficient apparatus, lasing action should still be obtained in the gas mixture when it is static, i.e., nonflowing.

In all cases, it is understood that the above-described arrangements are illustrative of a small number of the many possible specific embodiments that can represent applications of the principles of the invention. Numerous and varied other arrangements can readily be devised by those skilled in the art without departing from the spirit and scope of the invention.

What is claimed is:

1. A laser comprising
   means forming an interaction region,
   an active gaseous medium consisting essentially of a mixture of nitrogen gas and carbon disulfide gas disposed within said interaction region,
   means for pumping said mixture to produce substantial unreversed dissociation of said molecular gases, said pumping means producing a population inversion between a pair of rotational energy states of different vibrational energy levels in a component of said gas mixture, and
   means for extracting for utilization radiation corresponding to said pair of energy levels.

2. A laser according to claim 1 in which the nitrogen gas has a pressure in the range between 0.5 torr and 10.0 torr in the interaction region and carbon disulfide gas has a pressure between 0.05 torr and 0.5 torr in the interaction region.

3. Apparatus adapted for the stimulated emission of radiation, comprising
   means containing an active medium which is a mixture of gases and permitting the abstraction of radiation from said gases, said mixture consisting essentially of nitrogen gas and carbon disulfide gas, and
   means for pumping said mixture to enable said stimulated emission of radiation.

4. Apparatus adapted for the stimulated emission of radiation, comprising
   an active gaseous medium consisting essentially of a mixture of nitrogen gas and carbon disulfide gas,
   a vessel through which said mixture of gases may be flowed,
   means for producing an electric discharge to pump said mixture, and
   means for resonating said radiation in said vessel, said resonating means including a partially transmissive element permitting abstraction of a portion of said radiation.

5. Apparatus according to claim 4 in which the vessel has separate inlets for said nitrogen gas and said carbon disulfide gas and in which the means for producing an electric discharge is disposed in said nitrogen gas inlet to excite the nitrogen gas separately from said carbon disulfide gas.

6. A laser having an active medium which is a gas mixture consisting essentially of nitrogen gas and carbon disulfide gas.

7. A laser having an interaction region encompassed by a cooling jacket,
   means for flowing a coolant through said cooling jacket,
   means for flowing through said interaction region a gas mixture including nitrogen having a pressure in the range between 0.5 torr and 10.0 torr and carbon disulfide having a pressure in the range between 0.05 torr and 0.5 torr,
   means for pumping said mixture to produce substantial unreversed dissociation therein, and
   means for resonating in said interaction region a radiation corresponding to a vibrational-rotational transition in a component present in said gas mixture, said resonating means including means for extracting for utilization a portion of said radiation.

References Cited

Patel et al.: "Optical Maser Action in C, N, O, S, and Br," Phys. Rev., vol. 133, pp. A1244–A1248.

RONALD L. WIBERT, Primary Examiner

EDWARD BAUER, Assistant Examiner